United States Patent
Goehlich et al.

(10) Patent No.: US 9,487,285 B2
(45) Date of Patent: Nov. 8, 2016

(54) AIRCRAFT FUSELAGE STRUCTURE

(71) Applicants: Airbus Operations GmbH, Hamburg (DE); EADS Deutschland GmbH, Ottobrunn (DE)

(72) Inventors: Robert Alexander Goehlich, Hamburg (DE); Alexander Gahn, Hamburg (DE); Kai Fink, Hamburg (DE); Alexei Vichniakov, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 59 days.

(21) Appl. No.: 14/225,562

(22) Filed: Mar. 26, 2014

(65) Prior Publication Data

US 2014/0291447 A1 Oct. 2, 2014

(30) Foreign Application Priority Data

Mar. 26, 2013 (DE) .................. 10 2013 205 275

(51) Int. Cl.
*B64C 1/18* (2006.01)
*B64C 1/06* (2006.01)

(52) U.S. Cl.
CPC *B64C 1/061* (2013.01); *B64C 1/18* (2013.01)

(58) Field of Classification Search
CPC ................................ B64C 1/061; B64C 1/18
See application file for complete search history.

(56) References Cited

U.S. PATENT DOCUMENTS

| 3,476,421 | A | * | 11/1969 | Torres | E04B 1/1906 29/453 |
|---|---|---|---|---|---|
| 5,752,673 | A | * | 5/1998 | Schliwa | B64C 1/061 244/118.1 |
| 7,637,686 | B2 | | 12/2009 | Wood et al. | |

FOREIGN PATENT DOCUMENTS

| DE | 102009012428 A1 | 9/2010 |
|---|---|---|
| DE | 102010014638 A1 | 10/2011 |
| DE | 102010035787 A1 | 3/2012 |
| EP | 2 228 298 | 9/2010 |
| WO | WO 2011/073315 A1 | 6/2011 |

OTHER PUBLICATIONS

"Snap-Fit Design Manual." Author unknown. BASF Corporation, 2007.*
German Search Report for Application No. 10 2013 205 275.8 dated Sep. 16, 2013.
German Office Action for Application No. 10 2013 205 275.8 dated Mar. 5, 2014.

\* cited by examiner

*Primary Examiner* — Brian M O'Hara
*Assistant Examiner* — Michael Kreiner
(74) *Attorney, Agent, or Firm* — Jenkins, Wilson, Taylor & Hunt, P.A.

(57) ABSTRACT

Provided is an aircraft fuselage structure having an outer skin, a support structure arrangement comprising a multiplicity of frame elements and a floor structure arrangement having a multiplicity of floor support struts. The aircraft fuselage structure provides a connection between the floor structure arrangement and the support structure arrangement which is as simple and quick to produce as possible, while not significantly increasing the weight or weakening the structure. Either the floor structure arrangement or the support structure arrangement can have at a connection there between a male connector element or a female connector element. The male connector element can have a peg which extends in the engagement direction and which has a circumferential outer surface which is provided with a multiplicity of circumferential projections. The female connector element can have a cavity, the inner surface of which is provided with a multiplicity of circumferential tabs.

8 Claims, 3 Drawing Sheets

AIRCRAFT FUSELAGE STRUCTURE

TECHNICAL FIELD

The present invention relates to an aircraft fuselage structure having an outer skin, which encloses an inner space, which has an inner surface facing the inner space and which extends along an aircraft longitudinal axis, having a support structure arrangement comprising a multiplicity of frame elements, which extend in the circumferential direction along the inner surface of the outer skin and which are spaced apart from one another in a direction parallel to the aircraft longitudinal axis, and having a floor structure arrangement comprising a floor panel, which extends in a plane parallel to the aircraft longitudinal axis, a multiplicity of floor support beams, which extend along a lower surface of the floor panel and perpendicular to the aircraft longitudinal axis, and a multiplicity of floor support struts, which extend from the floor support beams at the lower surface of the floor panel to the frame elements, wherein the floor structure arrangement is connected to the support structure arrangement via connections.

BACKGROUND

In aircraft, the outer skin of the fuselage runs at least in a central section substantially in the shape of a cylindrical shell, wherein the cross section shape can however deviate from that of a circular cylinder. Frame elements thus extend along the outer skin preferably perpendicular to the aircraft longitudinal axis. As well as the frame elements, the support structure arrangement for the outer skin can comprise stringer elements which run perpendicular to the frame elements also along that surface of the outer skin which faces the inner space.

A floor structure arrangement, preferably in the form of a cabin floor, can be provided inside the fuselage. However, this can also be a freight floor. The floor panel need not necessarily take the form of an integral panel, but may also be assembled from various components or parts. The floor support struts can be struts of any form for taking up forces along their direction of extent.

The connections via which the floor structure arrangement is connected to the support structure arrangement are commonly formed in the prior art as riveted connections, wherein a section of the floor structure arrangement overlaps another section of the support structure arrangement and, in this overlap region, rivets are inserted through both arrangements which hold both arrangements against each other.

However, such riveted connections are disadvantageous for various reasons. On one hand, an overlap between the floor structure arrangement and the support structure arrangement implies an increase in weight, which in aircraft design must fundamentally be reduced. On the other hand, the structure is weakened by the bores which are necessary for receiving the rivets. A further disadvantage of the drilling process is the formation of swarf and dust, which is difficult to reduce. Moreover, the production of a riveted connection in the assembly process requires comparatively more time, and tight tolerances must be adhered to. Furthermore, the rivets themselves also imply excess weight, which, as mentioned above, is fundamentally disadvantageous in aircraft design. In ergonomic terms, connecting the floor support structure to the aircraft fuselage structure is most unsatisfactory. Specifically in this field, an alternative connection technology with short assembly times and better accessibility for workers would pay for itself in production.

SUMMARY

It is therefore an object of the present invention to provide an aircraft fuselage structure having a connection between the floor structure arrangement and the support structure arrangement which is as simple and quick to produce as possible, does not imply high weight or weaken the structure, and thus eliminates the abovementioned disadvantages.

This object is achieved in that either the floor structure arrangement or the support structure arrangement has, at the connection, a male connector element and the other of the floor structure arrangement and the support structure arrangement has, at the connection, a female connector element, in that the male connector element is brought into engagement, in an engagement direction, with the female connector element, in that the male connector element has a peg, which extends in the engagement direction and which has a circumferential outer surface, wherein a multiplicity of circumferential projections are arranged on the outer surface, which projections extend away from the surface at an angle to the engagement direction and are spaced apart from one another, and in that the female connector element has a cavity, which is designed to accommodate the peg, and which is surrounded by a circumferential inner surface of the female connector element, wherein this inner surface is provided with a multiplicity of circumferential tabs, which extend from the inner surface to the centre of the cavity and which are designed to be accommodated between the projections of the peg.

In this manner, the floor structure arrangement can be firmly and securely connected to the support structure arrangement by means of a simple male-female connection, i.e. by inserting a peg of the male connector element into the cavity of the female connector element, without the use of rivets being necessary. The male-female connection according to the invention can be produced in a very short time and in an uncomplicated manner, such that no expensive auxiliary devices or specially trained staff need be used therefor. At the same time, the connection according to the invention is at least as robust as a comparable riveted connection.

When the peg of the male connector element is inserted into the cavity of the female connector element, in order to produce a connection between the floor structure arrangement and the support structure arrangement, the projections provided on the outer surface of the peg, as seen from the centre of the cavity, press outwards the preferably flexible tabs on the inner surface of the female connector element against a biasing force, such that, after each projection which is pressed past them, the tabs are pressed by the biasing force into the space between the projections.

In this context, the flexibility of the tabs is preferably such that they can be moved in the engagement direction against a biasing force but cannot be moved opposite to the engagement direction. Such properties of the tabs can for example be achieved by means of a defined angle of inclination with respect to the inner surface of the female connector element, by means of corresponding material properties of the tab material or by fastening the tabs to the inner surface of the female connector element in a corresponding articulated manner. The tabs thus prevent the projections from moving in an opposite direction, such that the peg can no longer be moved out from the cavity.

The peg can be inserted to any depth in the cavity, wherein the further the peg is inserted into the cavity, i.e. the more projections are pressed past more tabs, the more stable the connection. In this manner, the position of the floor structure arrangement can also be adapted with respect to the support structure arrangement, whereby the assembly thereof is simplified. However, the peg is preferably inserted as far as a stop in the cavity.

In this context, the projections of a peg and the tabs of a female connector element are preferably evenly spaced, wherein the spacing between the projections corresponds to the spacing between the tabs.

It is of course also conceivable that the projections are flexible instead of the tabs, or that both the projections and the tabs are flexible.

In a preferred embodiment, either the frame elements or the floor support struts have the male connector element and the other of the frame elements and the floor support struts have the female connector element. The male-female connection according to the invention is thus produced between the frame elements and the floor support struts. The frame elements are particularly suited to taking up the loads of the floor structure arrangement via the floor support struts, since frame elements and floor support struts usually run in the same plane. It is however also conceivable that the floor support struts or other structural elements of the floor structure arrangement are connected, with the aid of the male-female connection according to the invention, to stringer elements running transversely to the frame elements.

In this context, it is particularly preferred if the frame elements have the female connector element and the floor support struts have the male connector element. Such an arrangement of male connector element and female connector element has proven to be particularly advantageous, since the floor support struts having the peg can be inserted into the female connector element of the frame element, and because the male connector element having the peg is simpler to fasten to the floor support struts.

It is further particularly preferred if the female connector element is fastened to the frame elements by means of a clamping device which grips the frame elements. Such a fastening of the female connector element to the frame element is particularly robust and at the same time can particularly easily be released, such that the female connector element can be removed or replaced.

It is in this case also particularly preferred if the male connector element is attached to that end of the floor support struts which is remote from the floor panel in such a way that the peg is arranged as an extension of the floor support struts. In this manner, the longitudinal forces acting on the floor support strut can be transmitted particularly well to the female connector element, and the male-female connection according to the invention is particularly robust. In particular, buckling of the male-female connection can be avoided. In addition, the assembly, i.e. the insertion of the peg into the cavity of the female connector element, is made easier by such an arrangement of the peg.

In a further preferred embodiment, the peg and the cavity are cylindrical in shape. For reasons of symmetry, the peg and the cavity being cylindrical in shape increases the robustness of the connection and simplifies the assembly, i.e. the insertion of the peg into the cavity, as no edges are present and a connection is possible regardless of the angular position of the peg transversely to its direction of extent.

In yet another preferred embodiment, the projections are inclined in a direction away from the engagement direction, and the tabs are inclined in the engagement direction. This means that the projections and the tabs are inclined such that the projections and the outer surface of the peg together define an acute angle oriented opposite to the engagement direction and an obtuse angle oriented in the engagement direction, and that the tabs and the inner surface of the female connector element together define an acute angle oriented in the engagement direction and an obtuse angle oriented opposite to the engagement direction. Preferably, those ends of the projections which face away from the outer surface of the peg point more in a direction having a component opposite to the engagement direction, and those ends of the tabs which face away from the inner surface of the female connector element point more in a direction having a component in the engagement direction.

Projections and tabs which are so inclined can easily be moved past each other, i.e. the tabs can easily be pressed aside, i.e. towards the inner surface of the female connector element, by the projections, against a biasing force, when the peg is inserted into the cavity. At the same time, projections and tabs which are so inclined prevent, in a particularly effective manner, the projections from being moved past the tabs opposite to the engagement direction, and the peg from being removed from the cavity.

In another preferred embodiment, the outer surface of the peg, including the projections, and the inner surface of the female connector element, including the tabs, comprise a hard plastic material. A hard plastic material is particularly suitable for the outer surface of the peg and the inner surface of the female connector element, which are to be moved past each other, since hard plastic has a suitable degree of elasticity or flexibility, such that the tabs and/or the projections yield to a sufficient degree and the projections can be moved past the tabs when the peg is inserted into the cavity. At the same time, a hard plastic material is robust enough, i.e. strong enough and stiff enough, such that the projections cannot be moved past the tabs opposite to the engagement direction, and the peg cannot be removed from the cavity of the female connector element once it is anchored there.

BRIEF DESCRIPTION OF THE DRAWINGS

In the following, the present invention will be explained in more detail with reference to a drawing representing merely a preferred embodiment, in which.

DETAILED DESCRIPTION

Figure 1:
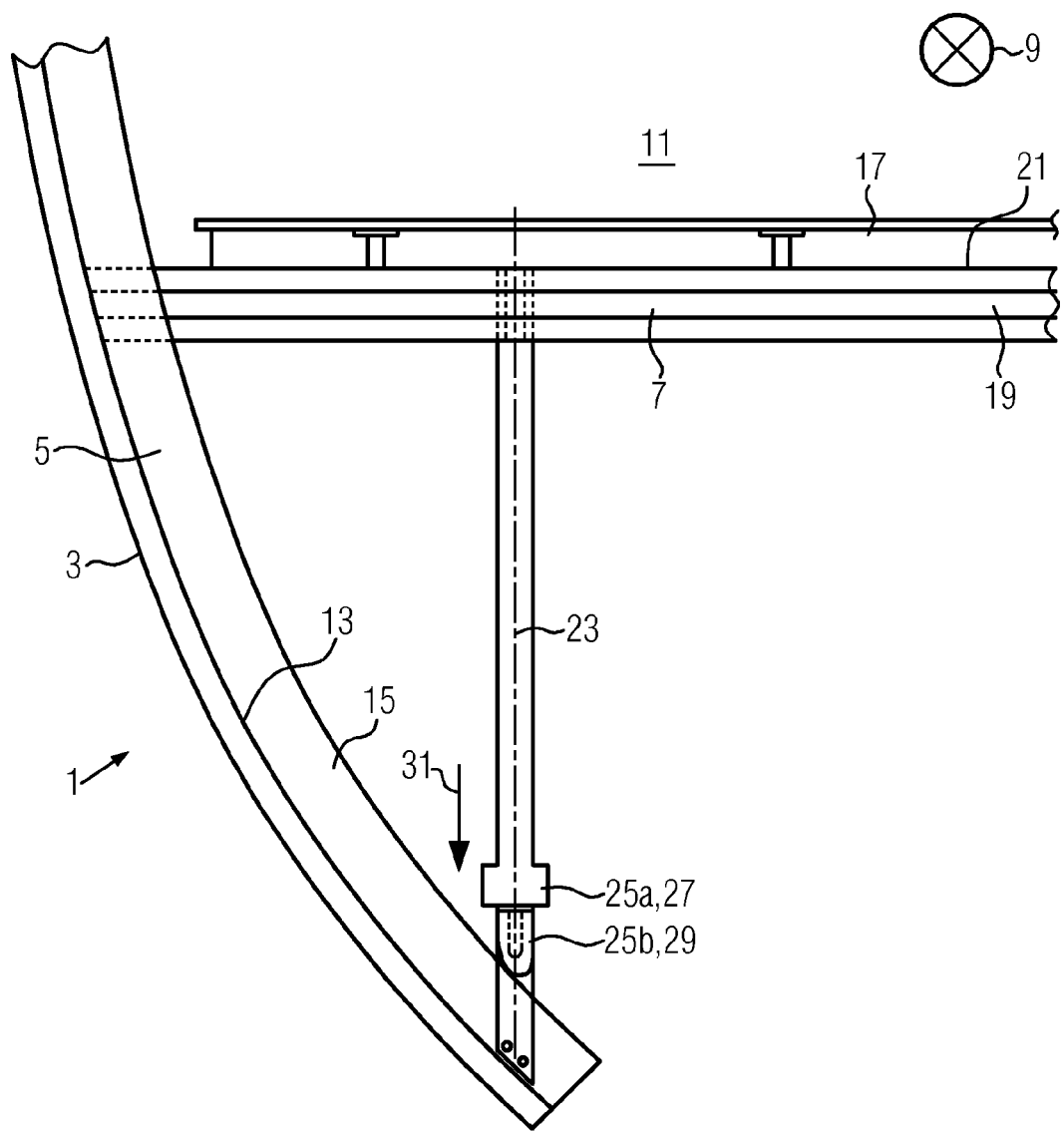
FIG. 1 shows a part of a sectional view, transverse to the aircraft longitudinal axis, of an embodiment of an aircraft fuselage structure according to the present invention.

FIG. 1 represents an embodiment of an aircraft fuselage structure 1 according to the invention, having an outer skin 3, a support structure arrangement 5 and a floor structure arrangement 7.

The outer skin 3 extends, in particular in the central section of the aircraft fuselage structure 1, in a substantially cylindrical shape along an aircraft longitudinal axis 9 and encloses an inner space 11. In the direction of the inner space 11, the outer skin 3 has an inner surface 13, along which the support structure arrangement 5 extends.

The support structure arrangement 5 comprises a multiplicity of frame elements 15 which extend perpendicular to the aircraft longitudinal axis 9 in the circumferential direction of the outer skin 3 along the inner surface 13 of the outer skin 3 and which are spaced apart from one another in a direction parallel to the aircraft longitudinal axis 9. Next to these there extend, parallel to the longitudinal axis on the inner surface 13 of the outer skin, a multiplicity of stringer elements which are not shown in greater detail.

The floor structure arrangement 7 comprises a floor panel 17, which extends in a plane parallel to the aircraft longitudinal axis 9, and a multiplicity of floor support beams 19, which extend along a lower surface 21 of the floor panel 17 and perpendicular to the aircraft longitudinal axis 9. A multiplicity of floor support struts 23 are provided in order to support the floor support beams 19, which struts extend perpendicular to the floor support beams 19 from the floor support beams 19 at the lower surface 21 of the floor panel 17 to the frame elements 15.

The floor structure arrangement 7 is connected to the support structure arrangement 5 via a connection having connection elements 25a, 25b formed by a male connector element 27 provided on the floor support struts 23 and a female connector element 29 provided on the frame elements 15, wherein the male connector element 27 is brought into engagement with the female connector element 29 in an engagement direction 31.

Figure 2:
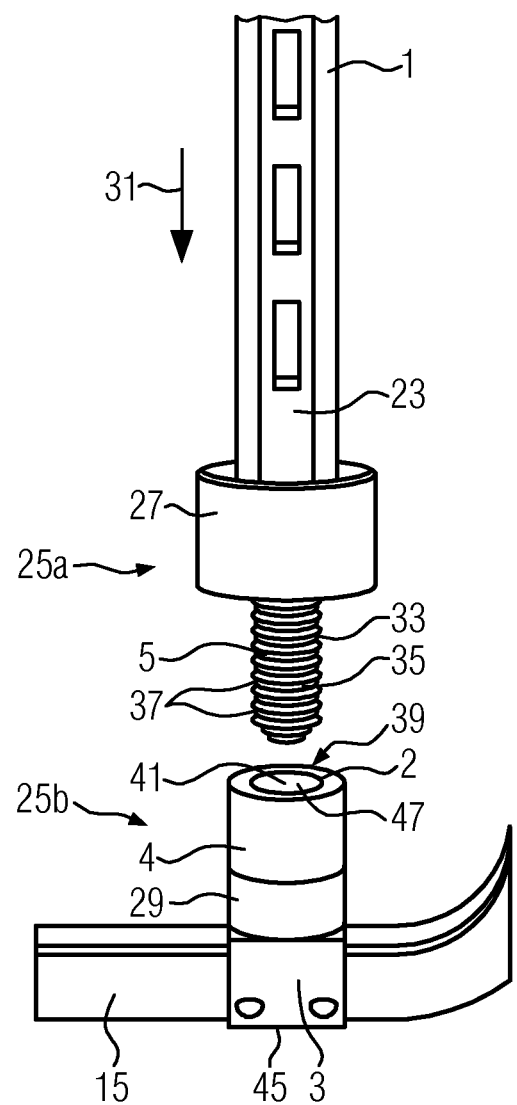
FIG. 2 shows a perspective view of a detail of a floor structure arrangement having a male connector element and a support structure arrangement having a female connector element of the aircraft fuselage structure from FIG. 1, before the male connector element comes into engagement with the female connector element.
Figure 3A:
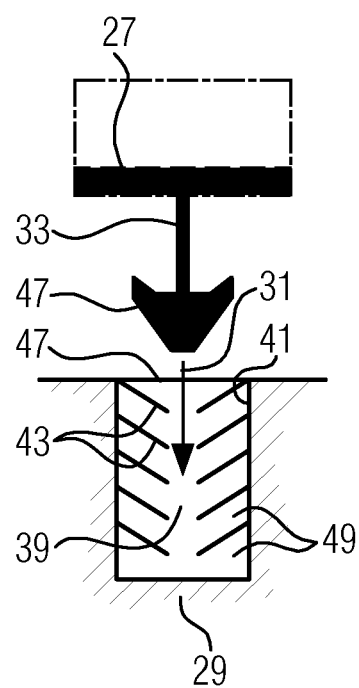
FIG. 3a shows a schematic cross-sectional view of the male connector element of the aircraft fuselage structure from FIG. 1 before coming into engagement with the female connector element.
Figure 3B:
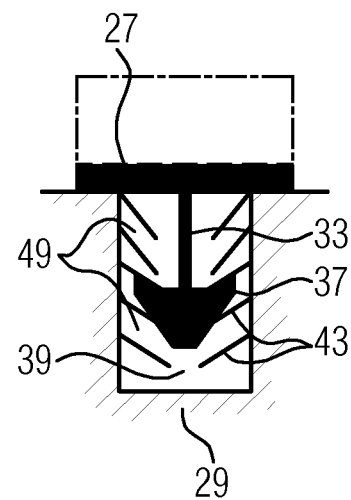
FIG. 3b shows a schematic cross-sectional view of the male connector element of the aircraft fuselage structure from FIG. 1 when in engagement with the female connector element.

As shown in FIG. 2, in this preferred embodiment the male connector element 27 has a peg 33 which extends in the engagement direction 31 and which has a cylindrical circumferential outer surface 35. This outer surface 35 is provided with a multiplicity of circumferential projections 37 which in this case extend perpendicular to the engagement direction 31 and which are spaced apart from one another. In this context, the male connector element 27 is attached to that end of the floor support struts 23 which is remote from the floor panel 17 such that the peg 33 forms an extension of the floor support struts 23. As shown in FIGS. 3a and 3b, the projections 37 are inclined in a direction away from the engagement direction 31. The projections 37, together with the remaining outer surface 35 of the peg 33, are made of a hard plastic material.

As is also shown in FIG. 2, the female connector element 29 has a cavity 39 which is designed to accommodate the peg 33 and which is surrounded by a cylindrical circumferential inner surface 41 of the female connector element 29. This inner surface 41 is provided with a multiplicity of circumferential tabs 43 which are shown in FIGS. 3a and 3b and which extend from the inner surface 41 to the centre of the cavity 39 and are designed to be accommodated between the projections 37 of the peg 33. As shown in FIG. 2, the female connector element 29 is fastened to the frame elements 15 by means of a clamping device 45 which grips the frame elements 15. FIGS. 3a and 3b also show that the tabs 43 are inclined in the engagement direction 31. The inner surface 41 of the female connector element 29, including the tabs 43, is further made of a hard plastic material.

The aircraft fuselage structure 1 can be assembled as follows. First, the female connector element 29, having the clamping device 45 attached to the female connector element 29, is fastened to the frame elements 15 of the support structure arrangement 5 by means of riveted connections, wherein the clamping device 45 grips the frame elements 15 from both sides and wherein the female connector element 29 is oriented such that the opening 47 of the cavity 39 faces in a direction in which the floor support struts 23 are to extend once the assembly is complete and which extends perpendicular to the floor support beams 19 (see FIG. 2).

The floor support struts 23 provided with a male connector element 27 are then oriented with respect to the female connector element 29 such that the peg 33 of the male connector element 27 extending as an extension of the floor support struts 23 is located opposite the opening 47 of the cavity 39 of the female connector element 29, wherein the peg 33 and the cavity 39 are arranged along one axis.

The floor support struts 23 are now moved by a force in the engagement direction 31 towards the female connector element 29, wherein the peg 33 is lowered into the cavity 39. The force which presses the peg 33 into the cavity 39 means that or must be adapted such that the projections 37 press the tabs 43 far enough aside in the engagement direction 31 until the projections 37 can be moved past the tabs 43 (see FIGS. 3a and 3b, in which however only one projection 37 is represented on the peg 33). The projections 37 are thus accommodated in the space 49 between the individual tabs 43. By virtue of the fact that the tabs 43 are inclined in the engagement direction 31 and the projections 37 are inclined opposite to the engagement direction 31, and that the angles of inclination of the tabs 43 and the projections 37 are substantially equal, the tabs 43 block the projections 37 in a direction opposite to the engagement direction 31 and ensure that the peg 33 can no longer be removed from the cavity 39.

The peg 33 can be inserted as far into the cavity 39, i.e. however many projections 37 can be moved past however many tabs 43, as is required for the assembly. At the male-female connection according to the invention, consisting of a male connector element 27 and a female connector element 29, the axial position of the floor support struts 23 can thus also be adjusted during the assembly. It is true here in principal that the further the peg 33 is inserted into the cavity 39, the more robust the connection. Usually, however, the peg 33 is inserted as far as a stop in the cavity 39.

Once the floor support struts 23 have been fastened to the frame elements 15 in the abovementioned manner, the floor support struts 23 are connected to the floor support beams 19 by means of conventional riveted connections at the other end from the male connector element 27, wherein the floor support struts 23 and the floor support beams 19 are at right angles to each other in a plane perpendicular to the aircraft longitudinal axis 9 (see FIG. 1). Of course, the floor support struts 23 can also be mounted on the floor support beams 19 before producing the male-female connection according to the invention. Then, but also beforehand, the floor support beams 19 can be fastened to the frame elements 15 by means of conventional riveted connections.

If the male-female connection according to the invention, between the male connector element 27 and the female connector element 29, has to be released again once produced, this can for example be carried out by drilling into the cavity 39.

By virtue of an aircraft fuselage structure 1 using such a connection by means of a male connector element 27 and a female connector element 29, the floor support struts 23 can be connected to the frame elements 15 in a very simple and strong manner, wherein the weight is reduced with respect to the use of a conventional riveted connection.

The invention claimed is:

1. An aircraft fuselage structure comprising:
   an outer skin that encloses an inner space, which has an inner surface facing the inner space and which extends along an aircraft longitudinal axis;
   a support structure arrangement comprising a multiplicity of frame elements, which extend in a circumferential direction along the inner surface of the outer skin and which are spaced apart from one another in a direction parallel to the aircraft longitudinal axis; and
   a floor structure arrangement comprising:
      a floor panel that extends in a plane parallel to the aircraft longitudinal axis,
      a multiplicity of floor support beams that extend along a lower surface of the floor panel and are perpendicular to the aircraft longitudinal axis, and
      a multiplicity of floor support struts that extend from the multiplicity floor support beams at the lower surface of the floor panel to the multiplicity of frame elements,
         wherein the floor structure arrangement is connected to the support structure arrangement via connections;
   wherein
   either the floor structure arrangement or the support structure arrangement comprises, at one of the connections, a male connector element and the other of the floor structure arrangement and the support structure arrangement comprises, at one of the connections, a female connector element;
   in that the male connector element is brought into engagement, in an engagement direction, with the female connector element;
   in that the male connector element comprises a peg that extends in the engagement direction and that comprises a circumferential outer surface, wherein a multiplicity of circumferential projections are arranged on the outer surface, the multiplicity of circumferential projections extending away from the circumferential outer surface at an angle to the engagement direction and being spaced apart from one another; and
   in that the female connector element comprises a cavity that is configured to accommodate the peg, and that is surrounded by a circumferential inner surface of the female connector element, wherein the circumferential inner surface comprises a multiplicity of circumferential tabs that extend from the circumferential inner surface to a center of the cavity and which are designed to be accommodated between the multiplicity of circumferential projections of the peg.

2. The aircraft fuselage structure according to claim 1, wherein either the multiplicity of frame elements or the multiplicity of floor support struts comprise the male connector element and the other of the multiplicity of frame elements and the multiplicity of floor support struts comprise the female connector element.

3. The aircraft fuselage structure according to claim 2, wherein the multiplicity of frame elements comprise the female connector element and the multiplicity of floor support struts comprise the male connector element.

4. The aircraft fuselage structure according to claim 3, wherein the female connector element is fastened to the multiplicity of frame elements by a clamping device that grips the multiplicity of frame elements.

5. The aircraft fuselage structure according to claim 3, wherein the male connector element is attached to an end of each of the multiplicity of floor support struts that is remote from the floor panel in such a way that the peg is arranged as an extension of the multiplicity of floor support struts.

6. The aircraft fuselage structure according to claim 1, wherein the peg and the cavity are cylindrical in shape.

7. The aircraft fuselage structure according to claim 1, wherein the multiplicity of circumferential projections are inclined in a direction away from the engagement direction and the tabs are inclined in the engagement direction.

8. The aircraft fuselage structure according to claim 1, wherein both the circumferential outer surface of the peg and the circumferential inner surface of the female connector element comprise a hard plastic material.

\* \* \* \* \*

UNITED STATES PATENT AND TRADEMARK OFFICE
CERTIFICATE OF CORRECTION

PATENT NO. : 9,487,285 B2
APPLICATION NO. : 14/225562
DATED : November 8, 2016
INVENTOR(S) : Goehlich et al.

It is certified that error appears in the above-identified patent and that said Letters Patent is hereby corrected as shown below:

On the Title Page

Item (73) Assignees:
Add --EADS Deutschland GmbH, Ottobrunn (DE)--

Signed and Sealed this
Seventeenth Day of October, 2017

Joseph Matal
*Performing the Functions and Duties of the
Under Secretary of Commerce for Intellectual Property and
Director of the United States Patent and Trademark Office*